(12) United States Patent
Allmann et al.

(10) Patent No.: US 9,538,362 B2
(45) Date of Patent: Jan. 3, 2017

(54) SERVICING CONTROL UNITS OF MOTOR VEHICLES VIA MOBILE RADIO

(71) Applicant: AUDI AG, Ingolstadt (DE)

(72) Inventors: Christian Allmann, Ingolstadt (DE); Thomas Collisi, Hilpoltstein (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/478,450

(22) Filed: Sep. 5, 2014

(65) Prior Publication Data

US 2015/0072681 A1 Mar. 12, 2015

(30) Foreign Application Priority Data

Sep. 6, 2013 (DE) ........................ 10 2013 014 878

(51) Int. Cl.
*H04W 4/00* (2009.01)
*H04W 8/08* (2009.01)
*H04W 48/18* (2009.01)
*G07C 5/00* (2006.01)
*B60R 16/023* (2006.01)
*H04L 29/06* (2006.01)
*H04L 29/08* (2006.01)
*H04W 12/08* (2009.01)
(Continued)

(52) U.S. Cl.
CPC ............ *H04W 8/08* (2013.01); *B60R 16/0231* (2013.01); *B60R 16/0234* (2013.01); *G07C 5/008* (2013.01); *H04L 63/102* (2013.01); *H04L 67/125* (2013.01); *H04W 12/08* (2013.01); *H04W 48/18* (2013.01); *H04W 60/04* (2013.01); *H04W 84/16* (2013.01)

(58) Field of Classification Search
CPC .. H04W 84/005; H04W 84/042; H04W 84/18; H04W 88/06; G08B 13/19647

USPC ...................... 455/435.1, 435.2, 423, 67.11, 115.1,455/226.1; 340/438–490
See application file for complete search history.

(56) References Cited

U.S. PATENT DOCUMENTS 6,603,982 B1 8/2003 Müller
6,826,414 B1 * 11/2004 Reynolds et al. ............ 455/555
(Continued)

FOREIGN PATENT DOCUMENTS

CN 102742327 A 10/2012
DE 199 25 254 A1 7/2000
(Continued)

OTHER PUBLICATIONS

Chinese Search Report issued by the Chinese Patent Office in Chinese Patent Application No. 2014104537025.
(Continued)

*Primary Examiner* — Allahyar Kasraian
(74) *Attorney, Agent, or Firm* — Henry M. Feiereisen LLC.

(57) ABSTRACT

In a method for wireless exchange of device data between a control unit of a motor vehicle and a vehicle-external computing device, a mobile radio connection is established between a mobile radio module of the motor vehicle and a mobile radio cell of a radio station coupled with the computing device. The device data are transmitted via the mobile radio connection. The radio station provides a private mobile radio cell which is different from all mobile radio cells of public mobile radio networks able to reach the motor vehicle. To establish the mobile radio connection in the motor vehicle, the mobile radio module is reconfigured for registering with the private mobile radio cell by using a SIM card.

14 Claims, 1 Drawing Sheet

(51) Int. Cl.
*H04W 60/04* (2009.01)
*H04W 84/16* (2009.01)

(56) References Cited

U.S. PATENT DOCUMENTS

| | | | |
|---|---|---|---|
| 2008/0167758 A1* | 7/2008 | Louch et al. | 701/2 |
| 2011/0205959 A1* | 8/2011 | Aalto et al. | 370/328 |
| 2013/0301584 A1* | 11/2013 | Addepalli | H04W 4/046 370/329 |
| 2015/0110035 A1* | 4/2015 | Lee et al. | 370/329 |

FOREIGN PATENT DOCUMENTS

| | | |
|---|---|---|
| DE | 100 33 808 A1 | 1/2002 |
| DE | 2004 015 163 | 8/2005 |
| DE | 2010 009 257 | 8/2011 |
| DE | 2011 110 965 | 2/2013 |

OTHER PUBLICATIONS

Translation of Chinese Search Report issued by the Chinese Patent Office in Chinese Patent Application No. 2014104537025.

* cited by examiner

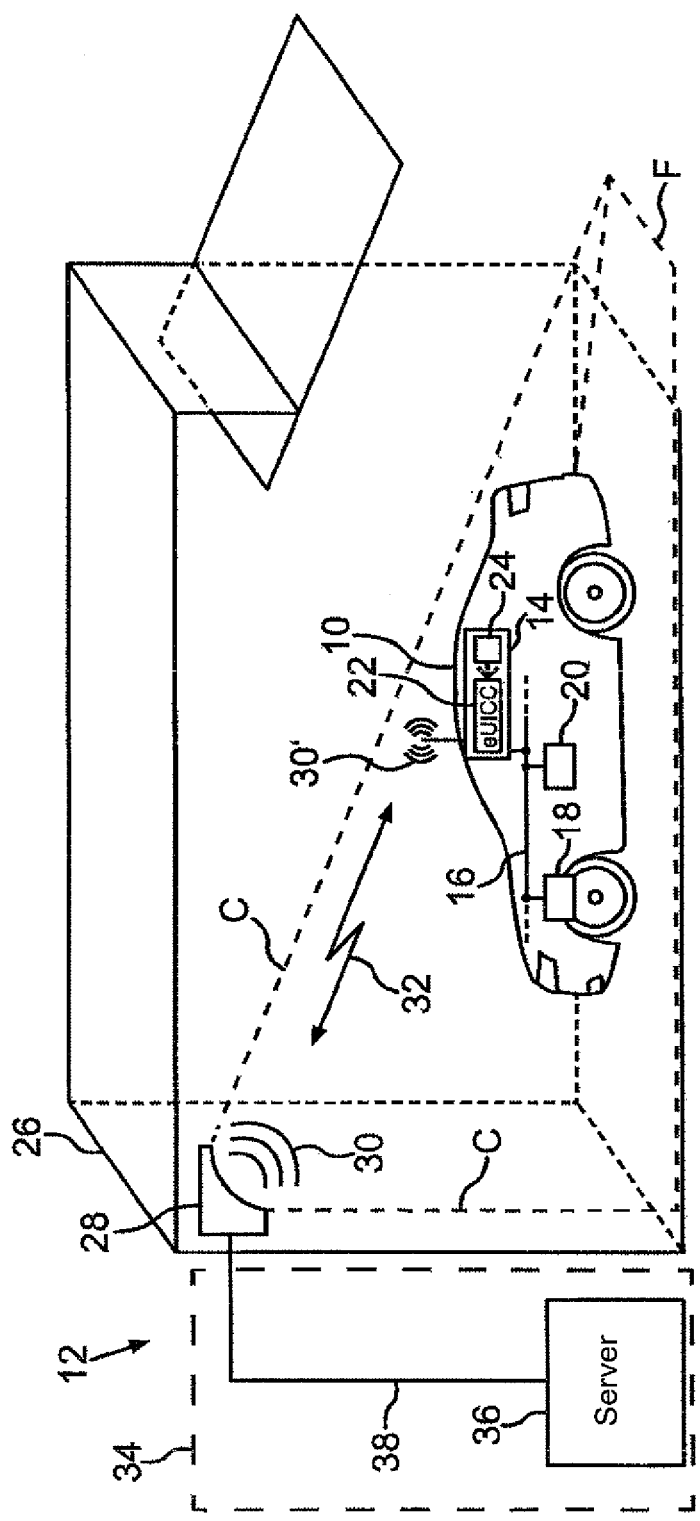

SERVICING CONTROL UNITS OF MOTOR VEHICLES VIA MOBILE RADIO

CROSS-REFERENCES TO RELATED APPLICATIONS

This application claims the priority of German Patent Application, Serial No. 10 2013 014 878.2, filed Sep. 6, 2013, pursuant to 35 U.S.C. 119(a)-(d), the content of which is incorporated herein by reference in its entirety as if fully set forth herein.

BACKGROUND OF THE INVENTION

The invention relates to a method for wireless exchange of device information between a control unit of a motor vehicle and a vehicle-external stationary computing device by establishing a mobile radio connection between a mobile radio module of the motor vehicle and a radio station of a mobile radio cell coupled to the computing device and transmitting the device data over the mobile radio connection.

The following discussion of related art is provided to assist the reader in understanding the advantages of the invention, and is not to be construed as an admission that this related art is prior art to this invention.

The ability to flexibly configure systems in motor vehicles has in conjunction with the continually falling cost of semiconductor memory led to a shift in the tasks from development to production of a motor vehicle in the following manner: While different variants of control units were initially developed for the various applications, modern control unit concepts provide a universal hardware basis, which can be flexibly configured for the particular application by using a suitable device. In this context, one differentiates between three different possibilities, namely encoding, parameterizing and flashing. With encoding, software switches are set to activate or deactivate certain parts of the application stored in the control unit or to inactive. Parameterizing includes loading of parameter lists and/or characteristic curves. Finally, with flashing of control units, either the complete application or parts thereof are loaded into the control unit and stored therein.

This approach significantly simplifies the provision of parts in production through logistics, because a smaller staging area is required at the assembly line and the worker needs to install a smaller number of variants. This reduces the likelihood of errors, and a control unit can be configured automatically, avoiding that workers are occupied with these tasks.

However, the fault-free operation of complex electronic systems requires the elimination of mistakes during the assembly process. This requirement is generally not met for manual assembly processes. In other words, there is a potential risk for installation errors. In order to still achieve the required quality targets, such processes must be protected by suitable tests.

This vehicle diagnosis is therefore performed in a wired configuration by using multichannel diagnostic communication. The communication with the higher-level host computer, i.e. with a central computing device for supplying the test device occurs wirelessly, for example via WLAN (Wireless Local Area Network) for the IT infrastructure of production, i.e. in particular its data network. The exchange of data on this radio connection is directed in particular to the vehicle equipment data, test programs including test parameters and the test result data for quality and statistical systems.

It is known in the art to establish a wireless connection to an internal vehicle module for data exchange of device data of vehicle control units. This eliminates the need for connecting a diagnostic device with a WLAN module to the motor vehicle. However, by using a radio connection, the transmission capacity disadvantageously depends on a current utilization of the radio cell and is therefore unreliable. An integration of this transmission technology in a manufacturing and/or servicing process of a motor vehicle is therefore risky.

It would therefore be desirable and advantageous to obviate prior art shortcomings and to provide an improved method and device for reliably exchanging wirelessly in a service facility and/or on factory premises device data between control units of motor vehicles and a vehicle-external central computing device of the service facility and/or the factory premises.

SUMMARY OF THE INVENTION

According to one aspect of the invention, a method for wireless exchange of device data between a control unit installed in a motor vehicle and a vehicle-external computing device includes setting up a mobile radio connection between a mobile radio module of the motor vehicle and a radio station of a mobile radio cell that is coupled with the vehicle-external computing device and has a private mobile radio cell that is different from all mobile radio cells of public mobile radio networks reaching the motor vehicle, wherein for setting up the wireless radio connection in the motor vehicle, the mobile radio module is reconfigured for registering with the private mobile radio cell by using a SIM card, and transmitting the device data via the mobile radio connection.

According to the invention, a private mobile radio cell is provided by the radio station with which the computing device is coupled, wherein the private mobile radio cell is different from all mobile radio cells of public mobile radio networks that can reach the motor vehicle. A mobile radio cell is the particular area that is technically served for transmission by a transmitting and receiving unit of the radio station, i.e. in which the mobile radio connection with the mobile radio module of the motor vehicle is possible. The mobile radio module may, for example, be a GSM module, a UMTS module or an LTE module or e.g. a mobile radio module that provides a plurality of the aforementioned mobile radio standards.

In other words, for example, a base station or radio station which is not connected to the public telephone network of a mobile radio provider, but rather to a separate data network of the central computing device, is provided on the premises where the vehicle is produced or serviced. A conventional mobile radio device, for example a Smartphone, and a conventional IMSI (International Mobile Subscriber Identity) acquired in conjunction with a mobile phone contract would therefore not allow access to this private mobile radio cell, i.e. registration with the IMSI would not be permitted. In particular, voice communication would also not be permitted in the private mobile radio cell, but only a transmission of device data from and/or for a processing unit of at least one control unit of a motor vehicle. Accordingly, the radio station is especially configured so that it can only be used to transmit device data exclusively to and from the central computing device.

Because just any mobile device is not allowed to communicate with the private mobile radio cell, the mobile radio module of the motor vehicle must be equipped to establish the mobile radio connection. The mobile radio module is therefore reconfigured in the motor vehicle for registering in the private mobile radio cell. In the method according to the invention, reconfiguration is performed by using a SIM card.

With the present invention, only a controlled number of wireless connections, which is limited by the number of reconfigured mobile radio modules located in the mobile radio cell of the motor vehicle, is advantageously established in the private mobile radio cell. The utilization of the transmission capacity of the radio station is thereby advantageously controlled so that a minimum band width can always be ensured for exchanging the device data.

For example, a separate SIM card may be provided for the reconfiguration, which is temporarily installed for example by a service technician during the production of the motor vehicle or when the motor vehicle undergoes service. According to an advantageous embodiment of the invention, however, the SIM card may be an embedded UICC (UICC—Universal Integrated Circuit Card) that is permanently installed in the motor vehicle. An embedded UICC is also referred to as eUICC. For example, a eUICC according to the standard ETSI TS 103 383 V12.0.0 (2013-02) may be provided. To reconfigure the mobile radio module, a new access profile is installed in the eUICC at least once for the registration in the private mobile radio cell and/or an access profile that was previously saved in the eUICC is activated. An access profile defines in a known manner during its activation in a mobile radio module the mobile radio network to which the mobile radio module establishes a wireless connection. It includes in particular the IMSI for registering in a specific mobile radio network.

A motor vehicle with an eUICC has the advantage that the access profile required for establishing the mobile radio connection to the private mobile radio cell may be provided in the motor vehicle as needed and/or at a later time, for example when the motor vehicle is brought to a repair shop and a control unit of the motor vehicle should be, for example, encoded, parameterized using device data or flashed by a central processing device of the repair shop for repairs or service via the mobile phone connection and/or error and/or status messages and/or measurement data should be read from the control unit for a vehicle diagnosis.

According to another embodiment of the invention, the mobile radio module may be reconfigured, after the exchange of the device data, for a registration in a public mobile radio network using the SIM card. In this way, the mobile radio module is later available to a user for network services, such as mobile telephony and/or an Internet data connection and/or an emergency call function, of a type the user accesses for example via a mobile phone contract for use of the public mobile radio network. The same mobile radio module is hence used twice.

According to another embodiment of the invention, a microcell or picocell or femtocell may be formed by the radio cell. A femtocell is a radio cell with minimal areal coverage. It is formed by a single radio station with a transmitting and receiving unit, which is used in relatively small areas, such as inside a factory or inside other individual rooms located inside buildings. In contrast to a femtocell, a radio connection in a microcell or picocell is set up with the radio station that penetrates through one or two or three walls of the building. Radio stations that provide picocells and femtocells are known in the art.

As discussed above, the device data are replaced especially while the motor vehicle is produced on factory premises and/or while the motor vehicle is repaired and/or serviced on the premises of a service facility. Providing a data channel in form of the mobile radio connection is here particularly advantageous in order to be able to encode and/or parameterize and/or flash the control unit in the motor vehicle in the aforedescribed manner based on the device data. While a WLAN module is installed in motor vehicles only in exceptional cases, motor vehicles are however already during production regularly equipped with a mobile radio module. Device data can advantageously be exchanged via the mobile radio connection with a variety of different motor vehicle models without additional circuit complexity.

Within the context of the present invention, device data are to be understood in particular as configuration data for the control unit and/or error messages and/or status messages of the control unit. The configuration data, such as encoding data for encoding, parameter data for parameterizing or program code data for flashing, are transmitted via the mobile radio connection to the control unit and stored in the control unit. Error messages and/or status messages are transmitted from the control unit to the central computing device where they are processed. The central computing device may in particular be a conventional computer system designed for performing vehicle diagnostics and/or vehicle maintenance in a service facility or a factory of a vehicle manufacturer.

The mobile radio module may be reconfigured or adapted to the private mobile radio cell, for example, manually by a service technician by activating a corresponding function in a configuration menu of the motor vehicle. According to another embodiment of the invention, a self-test may be initiated in the motor vehicle, and the mobile radio module is then reconfigured automatically by a control unit of the motor vehicle during the self-test. The reconfiguration is then advantageously integrated in the self-test.

The private mobile radio cell can be used to realize another advantage. According to another embodiment of the invention, the motor vehicle may be localized by the radio station on a factory premises or the premises of a service facility with a locating device. The motor vehicle can then be localized, for example, by radio triangulation on the premises of the service facility or the factory. To this end, several antennas may be installed on the premises at different locations, as is known from so-called "location based services". Known localization methods are for example GSM localization by evaluating the Time-Advance-Parameters and Cell-ID for a sector-specific localization of the motor vehicle on the premises.

The invention is not limited to a single radio cell. According to another embodiment of the invention, at least one additional radio station coupled to the central computing device may be provided, wherein each additional radio station includes a private mobile radio cell. The mobile radio cells of all radio stations are hereby connected so as to form a private mobile radio network. This has the advantage that the mobile radio connection is forwarded between the radio stations, so that the vehicle can be moved within the area covered by the private mobile radio network, and the device data can be transmitted during this time. In addition, an improved triangulation is possible with several radio stations.

According to another aspect of the invention, a motor vehicle includes at least one control unit for providing a respective vehicle functionality in the motor vehicle, for example an engine controller and/or a controller for an infotainment system. The motor vehicle also includes the aforedescribed mobile radio module which is configured to set up a mobile radio connection to a radio station of a mobile radio cell in dependence of a currently active access profile of an eUICC. A mobile radio connection to the described radio station of the private mobile radio cell can hence be established with a suitable active access profile. The motor vehicle according to the invention has two modes of operation, a driving mode and a service mode. In the driving mode, the at least one control unit provides its respective vehicle functionality. The driving mode is in particular active while driving, i.e. while the user of the motor vehicle drives the motor vehicle. The service mode is active in particular during the production of the motor vehicle and/or while the motor vehicle is a service facility. In the service mode, the at least one control unit is set up for reprogramming and/or verification of the respective vehicle functionality. Reprogramming hereby refers to one or more of the aforementioned methods of encoding, parameterization, and flashing. Checking is performed in particular by reading out error messages and/or status messages and/or performing a self-test.

In the motor vehicle according to the invention, a configuration device is provided which is configured to activate for the driving mode in the eUICC an access profile that is predefined by a vehicle user and for the service mode a user-independent access profile for a private mobile radio cell. In this way, in the service mode, device data to be exchanged with a central computing device of the production or service facility can advantageously be transmitted via a mobile radio connection of a private mobile radio cell. Conversely, in the driving mode, the user can use the mobile radio module to make telephone calls and/or to exchange user data via the Internet.

The motor vehicle according to the invention is preferably configured as a motor car, especially as a passenger car.

According to another aspect of the invention, the invention also includes a facility for production or service or repair of the vehicle. The facility has on its premises room for at least one motor vehicle. For example, the premises may be or may include a factory hangar or a garage. At least one radio station of the system has radio coverage which is to a major part directed towards to a portion of the premises or on the entire area. A central computing device of the system is configured to generate and/or process device data of at least one control unit of the at least one motor vehicle as well as to exchange the device data with the at least one motor vehicle via the at least one radio station. The at least one radio station is in each case configured to provide a private mobile radio cell. Thus, the same advantages are attained here as with the method of the present invention.

The motor vehicle according to the invention together with the facility according to the invention forms a system according to the invention, with which an embodiment of the method according to the invention can be performed.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a schematic diagram of an embodiment of the system according to the present invention.

DETAILED DESCRIPTION OF PREFERRED EMBODIMENTS

These depicted embodiments are to be understood as illustrative of the invention and not as limiting in any way. It should also be understood that the FIGURE is not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a motor vehicle 10 in a facility 12. The motor vehicle 10 may be in particular a motor car, such as a passenger car. The facility 12 may for example be a production plant where the motor vehicle 10 is produced, or a service facility, where the motor vehicle 10 is to be in serviced and/or repaired.

The motor vehicle 10 may include a mobile radio module 14, which may, for example, be a GSM, UMTS or LTE module or a module combining these radio technologies. In the motor vehicle 10, digital device data may be exchanged between the mobile radio module 14 one or more control units 18, 20 via a communication bus 16, such as a CAN bus. The mobile radio module 14 may include an eUICC 22 embodied as a SIM card for providing one or more access profiles to public mobile radio networks that offer, for example, mobile telephone calls and/or Internet access. The mobile radio module 14 may include a configuration device 24 for programming and/or switching between access profiles of the eUICC 22. The configuration device 24 may, for example, be a program module of a control processor of the mobile radio module 14. The eUICC 22 may be permanently installed in the motor vehicle 10. However, the eUICC 22 may also be provided an insertion slot in which an (unillustrated) user of the motor vehicle 10 may insert an additional SIM card, with which a public mobile communications network to be used by the mobile radio module 14 in a driving mode of the motor vehicle 10 may be defined.

The facility 12 may include, for example a hangar 26, such as a production facility or a service facility. In the illustrated example, the motor vehicle 10 is parked in the hangar 26. A radio station 28 of the facility 12 and the mobile radio module 14 may set up in a conventional manner a mobile radio connection 32 by way of mobile radio 30, 30' in order to exchange the aforementioned device data between the mobile radio module 14 and a central computing device 34. The transmission power of mobile radio station 28 may be so low that the radio station forms a femtocell F which extends, for example, only inside the hangar 26. The radio waves of mobile radio 30 may form a beam cone C directed to the femtocell F.

The computing device 34 may include a server system 36 and a data network 38 connecting the server system 36 to the radio station 28. The server system 36 may include one or more computers and may be configured to process device data of the control units 18, 20 and/or to supply device data to the control units 18, 20. The server system 36 may be a server system 36 for performing at least one vehicle diagnosis in the motor vehicle 10.

The femtocell F is a private mobile radio cell, i.e. the radio station 28 is in particular not connected to any packet-switched network, which may be part of a telephone network (PSTN—Public Switched Telephone Network). In particular, the radio station 28 is exclusively connected to the data network 38.

The server system 36 may also be connected via the data network 36 with one or more additional (unillustrated) radio stations of the facility 12. The server system 36 may for example be provided specifically for a production facility and/or a service facility. The server system 36 may also be connected via the data network 38 with several production facilities and/or several service facilities, in particular with one or more respective radio stations thereof. The data network may be based at least partially, for example, on the Internet Protocol (IP).

The facility 12 advantageously utilizes the increasingly comprehensive connectivity installed in motor vehicles which are equipped with SIM cards and a mobile radio module 14 controlled by the SIM cards. When an embedded SIM (eSIM) or eUICC 22 is installed in such a vehicle 10, the SIM is no longer permanently assigned to the wireless service provider. Through software adaptation (commissioning) of the eUICC 22, the provider/mobile radio provider can be freely selected without installing or changing a specific SIM. This commissioning may be performed, for example, with the configuration device 24. Commissioning makes it possible to provide connectivity of the motor vehicle also without connecting to the public wireless network, i.e. also to the femtocell F of the radio station 28.

A dedicated local mobile radio network, such as the femtocell F, enables the direct communication between the motor vehicle 10, for example via GSM, UMTS or LTE, and a back-end system which is in the present example embodied by the computing device 34. The access of the control units 18, 20 to this network enables a wireless exchange of device data between the testing technology of the computing device 34 and the vehicle 10, for example a parameterization of the control units 18, 20, reading/writing of fault memory entries, flashing the control units 18, 20, transmitting navigation data to a navigation device and/or for example a SWaP. Mobile radio services may be provided for internal, production-specific issues and services which should not be accessible via non-vehicle terminals, such as Smartphones. The status of the vehicle 10 may also be read and intentionally changed.

Especially with the new connection services, setting up a dedicated mobile radio network with the private mobile radio cell provided as the femtocell F and with additional private mobile radio cells networked therewith is advantageous, since the control units and their services can be tested in a production environment with an existing IT backend, i.e. with the computing device 34. Moreover, no additional hardware needs to be installed, because the eSIM can also be installed in all series-production motor vehicles for other purposes. The eSIM can therefore be pre-commissioned for the private mobile radio network of the vehicle manufacturer, i.e. may have a corresponding access profile that can be activated, if necessary, for example by the configuration device 24, when the motor vehicle is brought, for example, to a service facility, and is located for example in the femtocell F.

The private mobile radio network of the vehicle manufacturer, based for example on the individual femtocell Z, also allows service applications in garages and at dealers to directly access the motor vehicle via the mobile radio connection 32 without establishing a hard-wired connection with the motor vehicle 10 for testing. This allows the customer service to communicate with the motor vehicle for diagnostic purposes without the need to establish a wired connection in the service facility. The software of the motor vehicle 10 can hence be updated without the need to occupy a bay in the repair shop for a longer duration.

Testing of the motor vehicle 10 with the computing device 34 may include a multi-stage procedure: initially, for example, by sending a control command from the radio station 28, the computing device 34 may set the feature of the vehicle 10 to be tested, i.e. the control unit 18, 20 providing the vehicle functionality, to the state to be tested. In the next step, the measured value may be acquired, wherein measured data are transmitted from the motor vehicle 10 via the mobile radio connection 32 to the computing device 34. Finally, the computing device 34 can evaluate the measured values as to whether they remain within or exceed the set limits.

The diagnostic functions frequently used in tests may be:
a) Reading the identification of at least one control unit 18, 20 to determine whether the correct variant of the control unit was installed. This diagnostic service is frequently also used simultaneously to check whether a control unit 18, 20 can be addressed in principle by the diagnosis. It is checked whether a control unit 18, 20 is initially correctly powered and can be correctly addressed via the mobile radio connection 32.
b) Reading out an error memory of a control unit 18, 20 via the mobile radio connection 32, to determine whether the control unit 18, 20 is operating nominally. No error memory entries should be present after all startup and testing operations have been performed.
c) Reading out measured values is preferably used to read the measurement result during a test and to externally evaluate this result, for example, in the facility 12.

Furthermore, self-tests may be implemented in the control units 18, 20. These may either be triggered automatically, for example after "ignition on" was detected, i.e. the terminal-15 signal. The control units 18, 20 can also provide self-tests which must be triggered by the vehicle diagnostics. One example therefor is the automatic engine test. In this extensive test, the engine controller performs several successive test steps so as to test the functionality of all exhaust-relevant components. The test result is stored in the form of fault memory entries. Furthermore, so-called readiness codes allow a conclusion as to whether all partial tests were performed error-free or which partial tests may have been faulty.

To accommodate the commissioning and testing processes of the highly networked and complex vehicle electronics within shorter production cycle times, the performance of the employed test equipment must be brought to a high level. All possibilities of the vehicle-side diagnosis of the control units are exploited by using such high-performance devices. In particular, the multiple parallelism of the diagnostic communication via a diagnostic CAN and vehicle gateway and the increasing computational requirements at run-time by the so-called ASAM-ODX data input and other data containers (for example, the variant coding of the electronic control units) require high computational power and data throughput. These data rates can be ensured in a private mobile radio cell and a private radio network. The high computing power can be provided by the central computing device 34 outside the motor vehicle 10.

A local, private mobile radio network can also be set up in cooperation with a mobile radio provider of public mobile radio networks. For this purpose, a virtual private network (VPN—Virtual Private Network) may be configured within a public mobile radio network in a conventional manner.

Conventional motor vehicles usually have only one specific SIM card, with which either a unique identification of the user or the motor vehicle is possible for the purpose of exchanging information over a public mobile radio network. The key differences between the facility 12 and the vehicle 10 are that an embedded UICC (eUICC) is used instead of a SIM (customer or permanently installed). This eUICC is provisioned as needed for new networks (e.g. production network). This new technology provides expanded usage approaches. Independent thereof, the use of picocells/femtocells addresses the production and customer service. The required cooperation with a network operator is technically feasible (closed user group, localization, specific routing). An important difference is that telematics as well as location-based services can be created by employing such cell architectures for the production and possibly also for the customer service.

In summary, the example outlines an approach wherein product-independent and processor-independent, customizable mobile radio services can be provided for commissioning and/or servicing/repairing the motor vehicle by way of a manufacturer-independent eSIM and by using the eSIM a local, private mobile radio network.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for private wireless exchange of device data between a control unit installed in a motor vehicle and a vehicle-external computing device, comprising:
registering a mobile radio module of the motor vehicle with a private mobile radio cell that only provides device data to and from the vehicle-external computing device, said private mobile radio cell being different from all mobile radio cells of public radio networks, and not permitting registering conventional mobile phones with IMSI (International Mobile Subscriber Identity), said mobile radio module being registered using a SIM (Subscriber Identification Module) card, the SIM card is an embedded Universal Integrated Circuit Card (eUICC) that is permanently installed in the motor vehicle and data transfer between the private mobile radio cell and the controller is set up by storing an access profile in the eUICC at least once or activating an access profile already stored in the eUICC,
setting up data transfer between the control unit and the mobile radio module of the motor vehicle, and
transmitting device data provided to the mobile radio module by the control unit of the motor vehicle, to the private mobile radio cell with which the mobile radio module was registered by the SIM card, wherein after the device data is transmitted, the access profile changes the data transfer set up of the mobile radio module for registering the mobile radio module in one of the public mobile radio networks.

2. The method of claim 1, wherein the private mobile radio cell forms a microcell or a picocell or a femtocell.

3. The method of claim 1, wherein the device data are exchanged during manufacture of the motor vehicle on factory premises or during repair work or maintenance work of the motor vehicle in an area of a repair shop.

4. The method of claim 3, further comprising localizing the motor vehicle with a locating device on the factory premises or the area of the repair shop by way of the private mobile radio cell.

5. The method of claim 1, wherein at least one additional private mobile radio cell is connected with the vehicle-external computing device, with the at least one additional private mobile radio cell comprising a dedicated private mobile radio cell that operates with the GSM, UMTS or LTE communication standard, and wherein the private mobile radio cells are interconnected so as to form a private wireless network, that passes on the wireless mobile radio connection between the private mobile radio cells.

6. The method of claim 1, wherein the device data transmitted via the wireless mobile radio connection to the control unit and stored in the control unit include configuration data.

7. The method of claim 1, wherein the device data transmitted via the wireless mobile radio connection from the control unit to the central computing device and processed by the central computing device include error messages or status messages or values of measured data, or a combination thereof.

8. The method of claim 1, further comprising at least one of encoding, parameterizing and flashing the control unit based on the device data.

9. The method of claim 1, further comprising:
initiating a self-test in the motor vehicle, and
automatically reconfiguring the data transfer set up of the mobile radio module for data transfer between the control unit of the motor vehicle and the mobile radio module during a self test by a control unit of the motor vehicle.

10. The method of claim 1 wherein the mobile radio module is at least one of a GSM (Global System for Mobile Communications) module, a UMTS (Universal Mobile Telecommunications System) module and an LTE (Long-Term Evolution) module.

11. The method of claim 1 wherein the number of wireless connections of mobile radio modules with the private mobile radio cell is limited so that at least a given minimum band width is ensured for exchanging the device data with the mobile radio module.

12. The method of claim 1 wherein the mobile radio module only transmits device data to and from the vehicle-external computing device.

13. The method of claim 1, wherein the mobile radio module is connected to provide public cellular data communication, and the step of setting up data transfer reconfigures the connections of the mobile radio module to connect it to only communicate device data between the private mobile radio cell and the controller.

14. The method of claim 1, wherein the mobile radio module is connected to provide public cellular data communication, and the step of setting up data transfer reconfigures the connections of the mobile radio module to connect it to only communicate device data between the private mobile radio cell and a CAN (Controller Area Network) bus connected to the controller.

* * * * *

UNITED STATES PATENT AND TRADEMARK OFFICE
CERTIFICATE OF CORRECTION

PATENT NO. : 9,538,362 B2
APPLICATION NO. : 14/478450
DATED : January 3, 2017
INVENTOR(S) : Christian Allmann and Thomas Collisi It is certified that error appears in the above-identified patent and that said Letters Patent is hereby corrected as shown below:

On the second page, Column one, under ITEM (56), FOREIGN PATENT DOCUMENTS, correct:
"DE 2004 015 163" to read --DE 10 2004 015 163--;
"DE 2010 009 257" to read --DE 10 2010 009 257--;
"DE 2011 110 965" to read --DE 10 2011 110 965--.

Signed and Sealed this
Third Day of April, 2018

Andrei Iancu
*Director of the United States Patent and Trademark Office*